United States Patent [19]

Young

[11] 4,049,288
[45] Sept. 20, 1977

[54] TRAILER HITCH
[75] Inventor: David A. Young, Plymouth, Mich.
[73] Assignee: Hoover Ball and Bearing Company, Saline, Mich.
[21] Appl. No.: 713,334
[22] Filed: Aug. 11, 1976
[51] Int. Cl.² .............................................. B60D 1/04
[52] U.S. Cl. ................................. 280/406 A; 85/8.8
[58] Field of Search ........... 280/406 A; 85/8.8, 5 CP; 285/305

[56] References Cited
U.S. PATENT DOCUMENTS 3,451,695  6/1969  Tomen ........................ 280/406 A X
3,527,485  9/1970  Goward ............................... 285/305

Primary Examiner—Joseph F. Peters, Jr.
Assistant Examiner—R. Schrecengost
Attorney, Agent, or Firm—Olsen and Stephenson

[57] ABSTRACT

A weight distribution trailer hitch which has a pair of spring rods pivotally connected at their forward ends on vertical-axis pivot means adjacent the hitch ball and at their forward ends in a tensioned relation to the trailer tongue. The pivotal mounting for the forward ends of the spring rods is such that the spring rods are the same and are interchangeable and easily replaceable.

5 Claims, 5 Drawing Figures

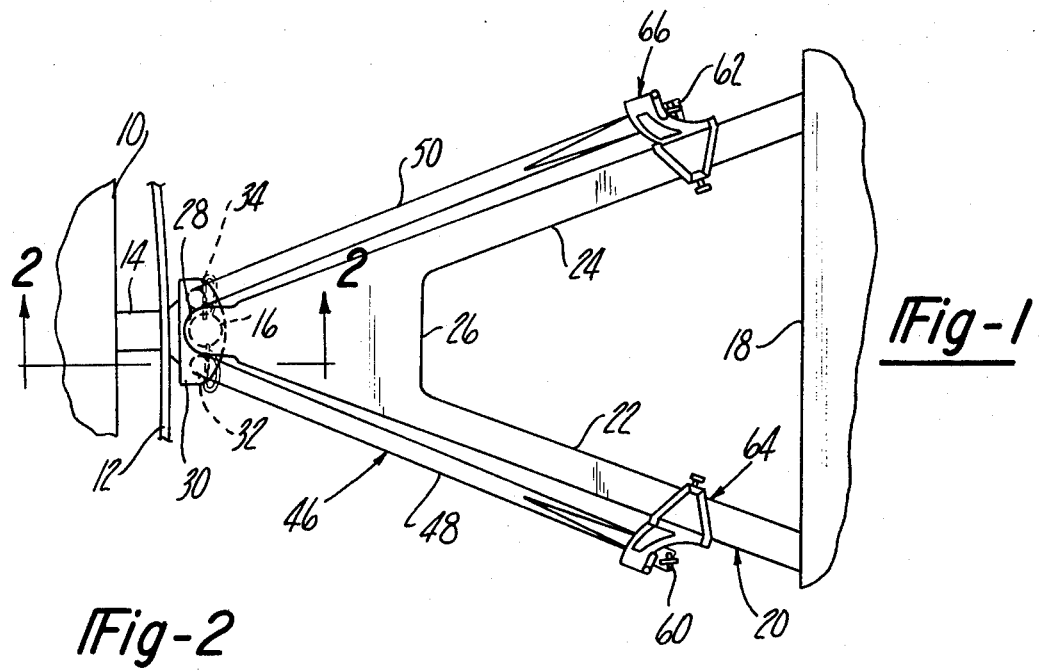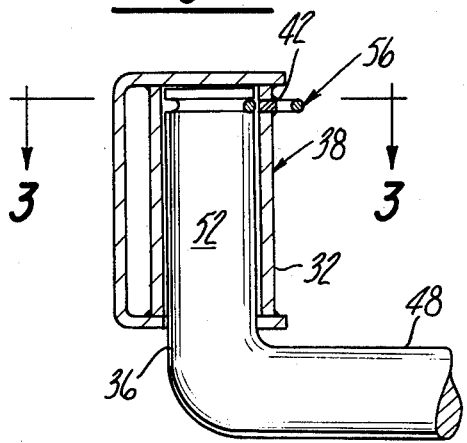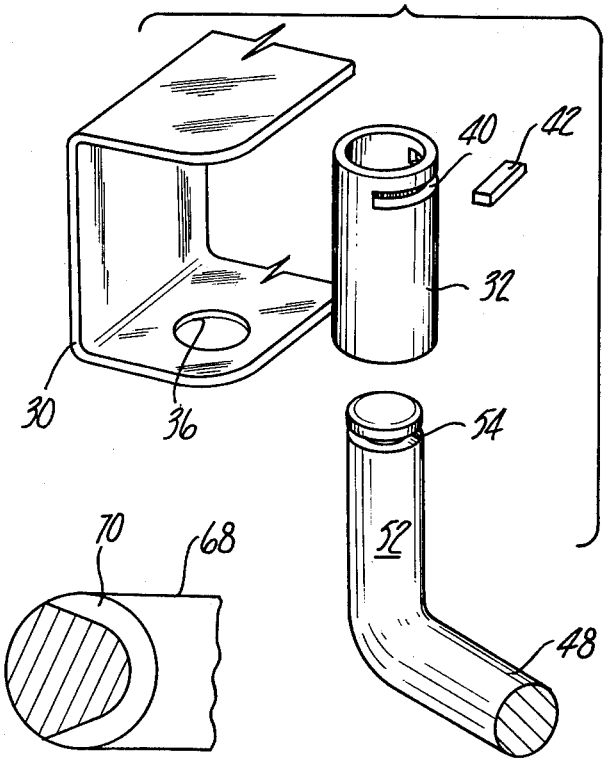

TRAILER HITCH

BACKGROUND OF THE INVENTION

The present invention relates to trailer hitch apparatus for towing trailers with an automobile. In particular, this invention is an improvement of the hitch apparatus disclosed in United States Letters Patent No. 2,817,541, patented Dec. 24, 1957.

The apparatus disclosed in the cited patent has proved to be commercially successful but one of its inadequacies has been the need for disbritutors to keep in inventory right and left hand spring rods for replacement parts, thereby doubling the inventory of spring rods needed for repair and servicing of this apparatus. This need has existed because of the construction and arrangement of the pivotal mountings that were required to support the forward ends of the spring rods. Thus, there has long existed a need for an improvement in the existing hitch apparatus whereby the spring rods and their pivotal mountings were constructed the same, thereby enabling them to be interchangeable so that distributors and users of the apparatus can keep as replacement or repair parts approximately one half as many spring rods as was formerly necessary. There also has been a need for a simplified pivotal mounting so that the spring rods can be installed and removed with greater ease.

SUMMARY OF THE INVENTION

The present invention has overcome the inadequacies of weight distribution trailer hitches of the type disclosed in aforesaid U.S. Pat. No. 2,817,541, and provides pivotal mountings for the forward ends of the spring rods wherein the spring rods are identically the same and are interchangeable, and in which the spring rods can be secured in the pivotal mounting and removed therefrom merely by the insertion and removal of a spring retention clip.

According to one form of the present invention a trailer hitch is provided comprising a pair of substantially vertical-axis pivot means mounted adjacent to the ball thereof at laterally opposite sides, a pair of normally straight spring rods having angular end portions rotatably mounted in the pivot means for lateral pivotal movement of the rods, a pair of generally vertically disposed flexible suspension members having the corresponding ends thereof attached to the free ends of the rods, and means adapted to be mounted on a trailer tongue above the rods and engaged by the flexible suspension members for bending the spring rods. The pivot means and the angular end portions have cooperating means preventing axial displacement of the angular end portions. The cooperating means of the pivot means and its associated angular end portion including a circumferentially extending groove near the terminal end of the end portion and a transverse opening in the associated pivot means having an axis extending tangentially through the groove of the end portion. A removable retaining clip is provided which has a leg extending through the transverse opening and said groove for preventing axial displacement of the angular end portion relative to the associated pivot means while still allowing lateral pivotal movement of the rod.

Preferably the opening through the associated pivot means is provided by initially cutting a slot partially through the pivot means, and thereafter welding a block member in a tangential direction through the slot so as to define with the pivot means two openings adjacent opposite ends of the block.

Thus, it is an object of the present invention to provide an improved trailer hitch of the type disclosed in aforesaid U.S. Pat. No. 2,817,541.

Other objects of this invention will appear in the following description and appended claims, reference being had to the accompanying drawing forming a part of this specification wherein like reference characters designate corresponding parts in the several views.

BRIEF DESCRIPTION OF THE DRAWING

FIG. 1 is a fragmentary top plan view of a trailer hitch embodying the present invention, showing the hitch attached to a trailer tongue;

FIG. 2 is an enlarged vertical section taken on the lines 2—2 of FIG. 1;

FIG. 3 is a transverse section taken on the lines 3—3 of FIG. 2

FIG. 4 is an exploded perspective view of one end portion of a spring rod and showing details of construction of the pivot means; and FIG. 5 is a fragmentary section through the groove of the end portion of a modified form of a spring rod embodying the present invention.

DESCRIPTION OF THE PREFERRED EMBODIMENTS

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring now to the drawing, the invention will be described in greater detail. A portion of an automobile 10 is shown having a bumper 12. A trailer hitch is mounted on the automobile 10 and has a draw bar 14 and a conventional ball 16. A trailer 18 having a tongue 20 is provided, the tongue 20 comprising a pair of channel bars 22 and 24 each secured at one end to the trailer 18 and converging forward toward and secured at the other end to a web 26. A socket 28 is provided at the forward end portion of the web 26 for engagement with the ball 16.

Attached to the draw bar 14, as by welding or the like, is the housing 30 in which are supported two socket tubes 32 and 34 in axial alignment with the holes 36 in the bottom wall of the housing 30. The socket tubes 32 and 34 are located on opposite sides of the ball 16.

Thus, each socket tube 32 and 34 in cooperation with the housing 36 provides a substantially vertical axis pivot means 38 mounted adjacent to the ball 16 at laterally opposite sides thereof. As can be seen best in FIGS. 2, 3 and 4, each socket tube 32 has a slot 40 cut therein adjacent to its upper end, and a block member 42 has been welded therein so that a transverse opening 44 extends through the pivot means 38 for a purpose to be described.

Spring rods 46 are provided for equalizing the load on the wheels of the automobile 10. In the present form of the invention, the rods 46 include left and right rods 48 and 50 having angular upturned forward end portions 52. In view of the fact that the spring rods 48 and 50 and their angular end portions 52 are identically the same, only the end portion 52 of the spring rod 48 will be described. The end portion 52 has a circumferentially extending groove 54 near the terminal upper end thereof, and in this embodiment of the invention the groove extends 360° around the circumference. The angular end portion 52 is adapted to be inserted into the pivot means 38 to the upper extremity thereof, after which a removable retaining clip 56 having a straight leg 58 can be inserted through the opening 44 and tangentially through the groove 54 to secure the angular end portion 52 therein against axial displacement. However, the spring rod 48 will remain free for lateral pivotal movement.

In the conventional manner, the free or rear ends of the spring rods 48 and 50 have chains or generally vertically disposed flexible suspension members 60 and 62 attached thereto by any suitable means and the conventional clips 64 and 66 are mounted on the channel bars 22 and 24 of the tongue 20. The details of the clip means 62 and 64 form no part of the present invention and reference is made to prior U.S. Pat. No. 2,817,541 for a more complete description of these components. It is to be understood that in the normal mounted positions, the rearward ends of the spring rods 48 and 50 are bent upward in a state of tension by the chains 60 and 62 and the associated clips 64 and 66.

From the foregoing description, it can readily be understood that the spring rods 48 and 50 are identically the same and can be interchangeably used in either vertical pivot means 38. The angular end of either spring rod can be secured in place in one of the pivot means 38 merely by inserting the end upward into the pivot means 38, and when fully inserted in place, the spring clip 56 can be pressed into the position shown in FIG. 3, after which the spring rod 48 will be retained against axial displacement. To remove the spring rod 48, only the spring clip 56 need be removed after which the spring rod 48 will freely fall from the pivot means 38.

Attention is now directed to FIG. 5 which shows a modified form of the angular end portion of a rod 68. The groove 70, which corresponds to the groove 54 of the previously described embodiment, extends around the circumference of the end portion only to the extent necessary to allow free pivotal movement in a lateral direction of the spring rod 68 relative to the hitch 14. In other respects, this embodiment of the invention is the same as the one shown in FIGS. 1–4.

It is claimed:

1. A trailer hitch having a ball for use with a socket of a trailer tongue to provide an articulated joint between an automobile on which the hitch is mounted and a trailer on which the trailer tongue is mounted, comprising a pair of substantially vertial-axis pivot means mounted adjacent to said ball at laterally opposite sides thereof, a pair of normally straight spring rods having angular end portions rotatably mounted in said pivot means for lateral pivotal movement of said rods, a pair of generally vertically disposed flexible suspension members having the corresponding ends thereof attached to the free ends of said rods, and means for mounting on the trailer tongue above said rods engaged by said flexible suspension members for bending said spring rods, said pivot means and said angular end portions having cooperating means preventing axial displacement of said angular end portions, the cooperating means of each pivot means and its associated angular end portion including a circumferentially extending groove near the terminal end of said end portion, a transverse opening in the associated pivot means having an axis extending tangentially through said groove, and a removable retaining clip having a leg extending through said opening and said groove for preventing axial displacement of the angular end portion relative to its associated pivot means, each said angular end portion having a circumferentially extending groove which extends partially around its circumference sufficient to allow said lateral pivotal movement and at a location the same as that of the angular end portion of the other spring rod so that said spring rods are interchangeable.

2. A trailer hitch having a ball for use with a socket of a trailer tongue to provide an articulate joint between an automobile on which the hitch is mounted and a trailer on which the trailer tongue is mounted, comprising a pair of substantially vertical-axis pivot means mounted adjacent to said ball at laterally opposite sides thereof, a pair of normally straight spring rods having angular end portions rotatably mounted in said pivot means for lateral pivotal movement of said rods, a pair of generally vertically disposed flexible suspension members having the corresponding ends thereof attached to the free ends of said rods, and means for mounting on the trailer tongue above said rods engaged by said flexible suspension members for bending said spring rods, pivot means and said angular end portions having cooperating means preventing axial displacement of said angular end portions, the cooperating means of pivot means and its associated angular end portion including a circumferentially extending groove near the terminal end of said end portion, a transverse opening in the associated pivot means having an axis extending tangentially through said groove, and a removable retaining clip having a leg extending through said opening and said groove for preventing axial displacement of the angular end portion relative to its associated pivot means, each of said pivot means including a socket tube in which a transverse groove has been cut, and a block member extending partially into said transverse groove and welded to said socket tube to define with the socket tube said transverse opening.

3. The trailer hitch that is defined in claim 2, wherein each said angular end portion has a circumferentially extending groove which extends 360° around its circumference so that said spring rods are interchangeable.

4. The trailer hitch that is defined in claim 2, wherein said block has a straight wall surface parallel to said axis of the transverse opening, and said leg of the retaining clip is straight and fits against the straight wall surface.

5. The trailer hitch that is defined in claim 2, wherein each said angular end portion has a circumferentially extending groove which extends partially around its circumference sufficient to allow said lateral pivotal movement and at a location the sameas that of the angular end portion of the other spring rod so that spring rods are interchangeable.

* * * * *